United States Patent [19]

Smalley et al.

[11] 3,975,496

[45] Aug. 17, 1976

[54] PROCESS FOR SETTLING RED MUD IN THE DIGESTION OF BAUXITE

[75] Inventors: Graham Smalley, Huddersfield; Eric Rothwell, Bradford, both of England

[73] Assignee: Allied Colloids Limited, Bradford, England

[22] Filed: Oct. 7, 1974

[21] Appl. No.: 512,579

[30] Foreign Application Priority Data

Oct. 10, 1973 United Kingdom............ 47321/73

[52] U.S. Cl............................. 423/122; 260/79.3 M; 423/121; 423/131; 209/5; 526/89; 526/240; 526/304; 526/317
[51] Int. Cl.².................... C01F 7/06; C01F 7/14
[58] Field of Search........... 423/121, 122, 625, 630; 209/5

[56] References Cited
UNITED STATES PATENTS

| | | | |
|---|---|---|---|
| 3,575,868 | 4/1971 | Galvin et al. | 423/121 |
| 3,716,617 | 2/1973 | Oku et al. | 423/121 |
| 3,755,531 | 8/1973 | Tsukawaki et al. | 423/625 |

OTHER PUBLICATIONS

Central Patents Index, Basic Abstracts Journal, Derwent Pub. Ltd., London, Nov. 19, 1971, Abstract 61030S (U.S.S.R. Pat. No. 285,912).

*Primary Examiner*—Herbert T. Carter
*Attorney, Agent, or Firm*—Lawrence Rosen; E. Janet Berry

[57] ABSTRACT

The invention provides novel water-soluble copolymers useful as flocculating agents, especially in flocculating the red mud formed during the Bayer process for the production of alumina from bauxite. The copolymers comprise anionic monomer units e.g. acrylic acid units in a mole percentage of less than 50% and acrylamide type units some of which are methylolated.

3 Claims, No Drawings

PROCESS FOR SETTLING RED MUD IN THE DIGESTION OF BAUXITE

Various synthetic polymers, including acrylamide polymers, are now widely used as flocculating agents. The choice of flocculating agent for any particular system depends inter alia, on the pH of the system. The purpose of the present invention is to provide improved flocculating agents for alkaline systems, for example in red mud flocculation.

During the Bayer process for the production of alumina from bauxite, in which the ore is digested at high temperature and pressure with an aqueous solution of sodium hydroxide, the aluminium content of the bauxite dissolves as sodium aluminate and insoluble impurities remain in suspension. The constitution of these impurities varies with the source of the ore and the conditions of the extraction. A typical bauxite ore analysis would be $Al_2O_3$ 53.10%, $Fe_2O_3$ 25.45%, $SiO_2$ 5.75%, $TiO_2$ 2.55% and unaccounted balance 13.15%, which frequently is assumed to be mainly water and some organic material. The impurities include iron oxides, sodium aluminosilicate and titanium oxide. These suspended impurities, which are commonly referred to as red mud because of their characteristic red-brown color and their finely divided state, usually constitute 30% to 50% by weight of the original ore.

For economical operation of the process it is essential that the red mud is settled rapidly, and to produce the required high grade of alumina the separation must be efficient giving overhead liquors of high clarity. Flocculating agents are therefore used to accelerate the settling process and to give good clarities, both factors being of great importance. It is known to use in the process natural products such as starch, synthetic polymers such as homopolymers of acrylic acid and methacrylic acid and their salts for example as described in U.S. Pat. No. 3,390,959, and combinations of starch and polyelectrolyte, as described in French Pat. Nos. 1,470,568 and 1,563,430. Non-ionic polymers such as methylolated polyacrylamide have also been described in USSR Pat. No. 285,912.

Starch based flocculants however are usually required in large quantities and tend to give poor rates of settlement but good clarities. Furthermore the use of starch can lead to persistence of organic matter in the liquors and this can cause problems at later stages in the process such as the hydrolysis stage and liquor concentration stages. On the other hand the clarities obtained with anionic homopolymers are generally inferior to those obtained with starch although superior settling rates have been reported.

In general typical synthetic polymers of the prior art proposed for red mud or other alkaline systems are either nonionic or are anionic. If anionic they are produced from compositions containing at least 80% by weight of anionic monomer.

It is a fact that the very wide range of known polyacrylamide flocculants which find extensive use in other mineral processing operations are rather unsatisfactory in alkaline systems and in particular most fail completely to effect the sedimentation of red mud and hitherto only a few polymers of selected composition have been found to have any effect at all.

We have now found that a new class of polyacrylamide flocculants are useful in alkaline systems, especially in red mud flocculation, both with regard to settlement rate and supernatant clarity. The flocculants are water soluble copolymers comprising the recurring monomer units:

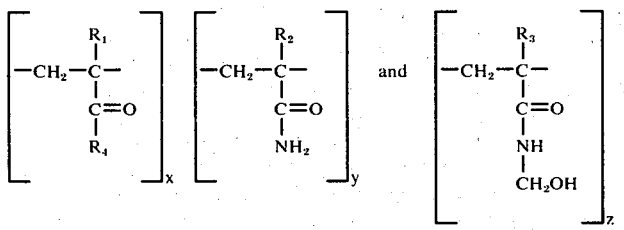

and in which $R_1$, $R_2$ and $R_3$ may be the same or different and represent H or $CH_3$; $R_4$ is OH, OM, or $NHR_5SO_3M$ where M is a cation such that the polymer is water soluble, e.g. Na or K, and $R_5$ is $-(CH_2)_m-$ where $m$ is 1 to 6. $x$, $y$ and $z$ are the mol % of the indicated monomeric units present in the polymer, $x+y+z = 100$. $x$ is always less than 50 and this is in marked contrast to the most successful known polymers, since in these the mole % of cationic group has always been above 80.

The polymers of our invention are surprisingly effective and superior to the anionic flocculants of the prior art and the methylolated homopolymers of acrylamide as described in USSR Pat. No. 285,912.

The anionic monomer may be selected from a wide range of anionic monomers including acrylic acid, methacrylic acid and N-sulphohydrocarbon substituted acrylamides

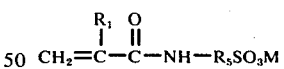

where $R_1$, $R_5$ and M are as defined above.

For achieving the optimum activity with respect to settlement rate and clarity, especially on red mud, we find that the following relationship should exist between $x$, $y$ and $z$, that is the molar percentages of the anionic, amido, and hydroxymethylamido units respectively: $x$ may be 2 to 40, preferably 4 to 20, and most preferably 6 to 15, while $y + z = 100 - x$, $z$ preferably being at least 20% of $y + z$, for example 20 to 90%. For example $z$ is often above 20 and is often not above 80.

The copolymer may also include a small amount, e.g. up to 10 mole % based on $x+y+z$, of other copolymerisable monomers.

The copolymers may be made by any convenient method, for example by methylolation of an acrylamide polymer, for example a copolymer of acrylamide and the required anionic monomer in the desired proportions and of the desired molecular weight for the final polymer.

The requirements of any particular flocculation process, e.g. any particular red mud substrate and plant conditions determines the order of molecular weight of the polymer. If the greater emphasis is upon settlement rate or the substrate is particularly diffiult to settle high molecular weight polymers are preferable, for example $5 \times 10^6$ to $15 \times 10^6$. If the emphasis is upon supernatant clarity or the substrate is particularly difficult to clarify lower molecular weight polymers are preferable, for example $0.5 \times 10^6$ to $5 \times 10^6$. It is possible to achieve a good overall performance by the use of a blend of terpolymers of high and low average molecular weight. In any case we find that the molecular weight of the polymer should be greater than $0.5 \times 10^6$.

The products of the invention have been found to be particularly effective as flocculating agents in highly alkaline systems where polyacrylamides of the prior art are relatively ineffective. They are particularly effective in the flocculation of red mud, and for assessment of the performance of the various products the following test method was adopted.

Final washed mud from an alumina plant operating the Bayer process was dispersed in water using a high speed mixer. Sodium hydroxide and sodium aluminate were added to adjust the liquor composition to that found under typical plant conditions, and the slurry was digested for 3 hours at 90°C with stirring.

The washed mud from the plant had the following characteristics:

| | |
|---|---|
| Suspended solids | 26% wt/wt. |
| Specific gravity | 1.186 |
| Solution pH | 12.6 |

The reconstituted red mud slurry had the following typical composition:

| | |
|---|---|
| Final washed mud | 292 mls/l |
| Sodium hydroxide | 60 g/l |
| Sodium aluminate | 281 g/l |

The performance of the products was then examined by dosing 250 ml. aliquots of the red mud slurry in 250 ml. measuring cylinders with dilutions of the products at a dosage level of 0.5 ppm product solids on volume of slurry. The settling rate of the flocculated mud suspension at 90°C was then determined, and after a settling period of 40 minutes a 50 ml. sample of the supernatant liquor was carefully withdrawn and filtered through a preweighed glass-fibre filter paper. The sediment on the paper was washed with $2 \times 150$ mls. hot deionised water. The paper with residue was dried at 210°C and reweighed to obtain the weight of sediment relative to the total liquor. The settlement figures are expressed as percentage mud volume relative to total liquor, and the clarity figures are expressed as g/l.

A further advantage of the products of the invention is that unlike products of the prior art they may be prepared on site, and by minor variation of the reaction conditions the product performance can be controlled to compensate for the day to day variations which occur in the red mud characteristics, which normally cannot be adequately dealt with by the application of any single flocculating agent of the prior art.

EXAMPLE 1

A copolymer of acrylamide and sodium acrylate containing 60% by weight acrylamide and 40% by weight sodium acrylate and having a 1% solution viscosity in 3 molar sodium chloride solution of 88 cs. (Polymer A) was dissolved in water to give a 1% solution. Sodium hydroxide was added to adjust the pH of the solution to 10.0 and then formalin was added in an amount equimolar with the amide content of the solution. The reaction was allowed to continue for 24 hours at 40°C to give a solution referred to in Table 1 as Polymer B.

Reactions were similarly carried out on a copolymer containing 80% by weight acrylamide and 20% by weight sodium acrylate (Polymer C) with a 1% solution viscosity in 3 molar sodium chloride solution of 80 cs., to give Polymer D, and on a copolymer containing 90%, acrylamide and 10% sodium acrylate (Polymer E) with a 1% solution viscosity in 3 molar sodium chloride solution of 99 cs. to give Polymer F, and on polyacrylamide (Polymer G) with a 1% solution viscosity in 3 molar sodium chloride solution of 77 cs. to give Polymer H, a product of the prior art. The performance of these polymers was compared with Polymer I a sodium polyacrylate polymer of the prior art.

TABLE 1

| Polymer | Mole % Methylolated amide | Settling Rates Percentage mud volume vs. time(mins) | | | Supernatant Clarity |
|---|---|---|---|---|---|
| | | 10 mins. | 20 mins. | 30 mins. | g/l |
| A | 0 | 93.6 | 81.6 | 68 | 0.278 |
| B | 20 | 86.4 | 71.2 | 60 | 0.134 |
| C | 0 | 94.4 | 80.8 | 72 | 0.238 |
| D | 21 | 83.2 | 67.2 | 56 | 0.112 |
| E | 0 | NDML* | 78 | 73 | 0.280 |
| F | 26 | 88.8 | 64.8 | 55.2 | 0.038 |
| G | 0 | NDML | NDML | 72 | 0.334 |
| H | 46 | NDML | 80.3 | 58.2 | 0.140 |
| I | — | 86.4 | 69.6 | 62.4 | 0.088 |
| No addition | — | 96.2 | 88.2 | 76 | 0.726 |

*NDML indicates no definite mud line had been formed at this time.

These results clearly show the improvement in both settlement rate and clarity obtained on methylolation of anionic copolymers. Also is demonstrated the superiority of product in the preferred range of compositions, Polymer F, over products of the prior art, Polymers H and I.

EXAMPLE 2

A 1% solution of polyacrylamide with a 1% solution viscosity in 3 molar brine of 77 cs. was caused to react with formaldehyde and various mole proportions of sodium bisulphite to give a range of products of different methylol and sulpho methylene content (—CH₂SO₃Na).

TABLE 2

| Polymer | Molar ratio of reactants | | | Product analysis | |
|---|---|---|---|---|---|
| | Amide | Formaldehyde | Bisulphate | Mole % Methylol | Mole % Sulphomethylene |
| J | 1 | 1 | 1.5 | 6.5 | 29.0 |
| K | 1 | 1 | 0.75 | 40.5 | 14.5 |
| L | 1 | 1 | 0.25 | 80.0 | 5.0 |

The products were tested in comparison with Polymers H and I of the prior art at the same dosage level of 0.5 ppm solids product on slurry and the results are given in Table 3.

TABLE 3

| Polymer | Settling Rates Percentage mud volume vs. time(mins) | | | Clarity g/l |
|---|---|---|---|---|
| | 10 mins. | 20 mins. | 30 mins. | |
| H | 78.4 | 65.2 | 60.4 | 0.194 |
| I | 77.6 | 58.8 | 55.4 | 0.164 |
| J | 76.6 | 58.4 | 52.8 | 0.134 |
| K | 79.2 | 60.0 | 54.6 | 0.108 |
| L | 79.6 | 60.0 | 54.0 | 0.106 |
| No addition | 94.0 | 88.8 | 80.0 | 0.698 |

Thus it is clearly seen the compositions of the invention Polymers J and especially K and L are significantly better then compositions Polymers H and I of the prior art.

EXAMPLE 3

A 25% solution of sodium 2-acrylamide-2 methylpropanesulphonate was polymerised using 1 ppm $Fe^{2+}$ and 50 ppm potassium persulphate as initiator to give Polymer M having a 1% solution viscosity of 12 cs. in 3 molar sodium chloride solution.

Similarly prepared was a copolymer Polymer N containing 90% acrylamide and 10% sodium 2-acrylamide-2-methyl propane sulphonate showing a 1% solution viscosity of 78 cs. in 3 molar sodium chloride solution.

A 1% solution of Polymer N in deionised water was reacted at pH 10 and 40°C for 2 hours with formalin in an amount equimolar with the amide content of the solution to give Polymer O.

Polymers M, N, and O were tested in comparison with polymers I and J by the standard test procedure using a batch of slurry which was difficult to settle at a dosage level of 0.5 ppm solids product on slurry.

TABLE 4

| Polymer | Settling Rates Percentage mud volume vs.time (mins) | | | Clarity g/l |
|---|---|---|---|---|
| | 10 mins. | 20 mins. | 30 mins. | |
| M | 96 | 85 | 75 | 0.40 |
| N | 96 | 86 | 75 | 0.22 |
| O | 95 | 83 | 73 | 0.14 |
| I | 95 | 84 | 75 | 0.38 |
| J | 94 | 82 | 71 | 0.12 |
| No addition | 97 | 87 | 83 | 0.88 |

Thus again it is seen that products of the invention Polymers O and J give significantly better results than products of the prior art Polymer I and other related products whose compositions fall outside the scope of the invention Polymers M and N.

What is claimed is:

1. In a process for the production of alumina from bauxite comprising the steps of digesting bauxite with aqueous sodium hydroxide to give a suspension of red mud in a solution of sodium aluminate, settling said red mud and processing the resultant supernatant sodium aluminate solution to obtain alumina, the improvement comprising settling said red mud by addition to said suspension of an effective amount of a water-soluble polymer having a molecular weight greater than 0.5 times $10^6$ and comprising the recurring monomer units:

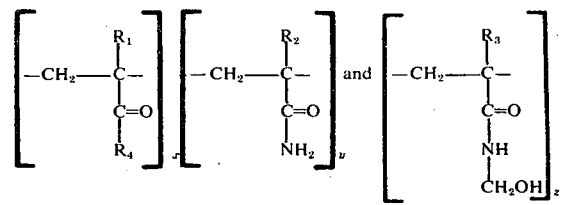

in which $R_1$, $R_2$ and $R_3$ are independently selected from the group consisting of hydrogen and methyl; $R_4$ is selected from the group consisting of OH, OM and $NHR_5SO_3M$ where M is a cation such that the polymer is water-soluble and $R_5$ is $—(CH_2)_m$ where $m$ is 1 to 6; and $x$, $y$, and $z$ are the mole percentages of the indicated monomer units based on $x + y + z = 100$, $x$ being 2 to 40 and $y+z$ being 60 to 98.

2. The process of claim 1 wherein $x$ is from 4 to 20.

3. The process of claim 2 wherein $z$ is at least 20% of $y + z$.

* * * * *